United States Patent
Cole et al.

(10) Patent No.: US 10,335,644 B2
(45) Date of Patent: *Jul. 2, 2019

(54) REINFORCED FACES OF CLUB HEADS AND RELATED METHODS

(71) Applicant: KARSTEN MANUFACTURING CORPORATION, Phoenix, AZ (US)

(72) Inventors: Eric V. Cole, Phoenix, AZ (US); Eric J. Morales, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,389

(22) Filed: May 26, 2017

(65) Prior Publication Data

US 2017/0259129 A1   Sep. 14, 2017

Related U.S. Application Data

(63) Continuation of application No. 14/282,802, filed on May 20, 2014, now Pat. No. 9,687,699, which is a
(Continued)

(51) Int. Cl.
| | |
|---|---|
| *A63B 53/04* | (2015.01) |
| *A63B 60/00* | (2015.01) |
| *B23K 9/04* | (2006.01) |
| *B23K 9/167* | (2006.01) |
| *B23K 9/173* | (2006.01) |
| *B23K 9/235* | (2006.01) |
| *B23K 26/38* | (2014.01) |
| *B23K 9/16* | (2006.01) |
| *B23K 31/02* | (2006.01) |

(Continued)

(52) U.S. Cl.
CPC ............ *A63B 53/04* (2013.01); *A63B 53/047* (2013.01); *A63B 53/0466* (2013.01); *A63B 60/00* (2015.10); *B23K 9/042* (2013.01); *B23K 9/044* (2013.01); *B23K 9/16* (2013.01); *B23K 9/167* (2013.01); *B23K 9/173* (2013.01); *B23K 9/235* (2013.01); *B23K 26/38* (2013.01); *B23K 31/02* (2013.01); *B26F 3/004* (2013.01); *A63B 60/54* (2015.10); *A63B 2053/0454* (2013.01); *A63B 2209/00* (2013.01); *B23K 2103/10* (2018.08); *B23K 2103/14* (2018.08); *Y10T 29/49826* (2015.01)

(58) Field of Classification Search
USPC .................................................. 473/324–350
See application file for complete search history.

(56) References Cited

U.S. PATENT DOCUMENTS

| | | | | | |
|---|---|---|---|---|---|
| 3,770,427 | A | * | 11/1973 | Petersen | ............... C22C 19/053 420/446 |
| 4,503,314 | A | * | 3/1985 | Kakimi | ............... B23K 35/0255 219/121.14 |

(Continued)

FOREIGN PATENT DOCUMENTS

| | | | |
|---|---|---|---|
| JP | 11169493 | | 6/1999 |
| JP | 11169493 | A * | 6/1999 |

(Continued)

*Primary Examiner* — Alvin A Hunter

(57) ABSTRACT

Some embodiments include a reinforced face of a club head. Other embodiments for related reinforced faces of club heads and related methods are also disclosed.

18 Claims, 4 Drawing Sheets

Related U.S. Application Data continuation of application No. PCT/US2012/038681, filed on May 18, 2012, and a continuation of application No. 13/407,559, filed on Feb. 28, 2012, now Pat. No. 8,777,777.

(51) Int. Cl.
| | |
|---|---|
| *B26F 3/00* | (2006.01) |
| *B23K 103/10* | (2006.01) |
| *B23K 103/14* | (2006.01) |
| *A63B 60/54* | (2015.01) |

(56) References Cited

U.S. PATENT DOCUMENTS

| | | | | |
|---|---|---|---|---|
| 4,725,509 | A * | 2/1988 | Ryan | B23K 35/0238 228/262.72 |
| 4,768,787 | A * | 9/1988 | Shira | A63B 53/04 473/331 |
| 5,242,167 | A * | 9/1993 | Antonious | A63B 53/04 473/350 |
| 5,316,298 | A * | 5/1994 | Hutin | A63B 53/04 273/DIG. 23 |
| 5,405,136 | A | 4/1995 | Hardman | |
| 5,464,211 | A * | 11/1995 | Atkins, Sr. | A63B 53/04 473/346 |
| 5,482,282 | A * | 1/1996 | Willis | A63B 53/04 473/324 |
| 5,505,795 | A * | 4/1996 | Tsai | A63B 53/02 148/522 |
| 5,533,729 | A * | 7/1996 | Leu | A63B 53/04 473/346 |
| 5,586,947 | A * | 12/1996 | Hutin | A63B 53/04 473/324 |
| 5,649,872 | A * | 7/1997 | Antonious | A63B 53/04 473/332 |
| 5,669,825 | A * | 9/1997 | Shira | A63B 53/04 473/324 |
| 5,669,829 | A * | 9/1997 | Lin | A63B 53/04 473/342 |
| 5,697,855 | A * | 12/1997 | Aizawa | A63B 53/04 473/332 |
| 5,709,615 | A * | 1/1998 | Liang | B22D 19/02 29/428 |
| 5,873,795 | A * | 2/1999 | Wozny | A63B 53/04 473/346 |
| 5,967,903 | A * | 10/1999 | Cheng | A63B 53/04 473/342 |
| 6,007,923 | A * | 12/1999 | Shimizu | B23K 35/005 148/421 |
| 6,089,992 | A * | 7/2000 | Onuki | A63B 53/04 473/324 |
| 6,538,234 | B2 * | 3/2003 | Toyoda | B23K 9/173 219/137 WM |
| 6,605,007 | B1 | 8/2003 | Bissonnette et al. | |
| 6,617,537 | B1 * | 9/2003 | Chiu | A63B 53/04 219/121.14 |
| 6,776,726 | B2 | 8/2004 | Sano | |
| 6,783,466 | B2 * | 8/2004 | Seki | A63B 53/04 473/345 |
| 6,896,627 | B2 * | 5/2005 | Hou | A63B 53/047 473/335 |
| 7,169,059 | B2 * | 1/2007 | Rice | A63B 53/0466 473/329 |
| 7,192,364 | B2 * | 3/2007 | Long | A63B 53/04 473/329 |
| 7,261,643 | B2 * | 8/2007 | Rice | A63B 53/0466 473/329 |
| 7,367,899 | B2 * | 5/2008 | Rice | A63B 53/0466 473/329 |
| 7,384,348 | B2 * | 6/2008 | Lin | A63B 53/04 473/332 |
| 7,448,961 | B2 * | 11/2008 | Lin | A63B 53/04 473/332 |
| 7,481,717 | B2 | 1/2009 | Knuth | |
| 7,563,175 | B2 | 7/2009 | Nishitani et al. | |
| 7,833,110 | B2 * | 11/2010 | Nakamura | A63B 53/0466 473/332 |
| 7,914,396 | B2 * | 3/2011 | Imamoto | A63B 53/0466 473/342 |
| 7,931,545 | B2 | 4/2011 | Soracco et al. | |
| 8,007,372 | B2 * | 8/2011 | Long | A63B 53/0466 473/330 |
| 8,016,691 | B2 * | 9/2011 | Stites | A63B 53/04 473/290 |
| 8,226,498 | B2 * | 7/2012 | Stites | A63B 53/0466 473/329 |
| 8,246,489 | B2 * | 8/2012 | Yamamoto | A63B 53/0466 473/346 |
| 8,777,777 | B2 * | 7/2014 | Cole | B23K 9/044 473/342 |
| 9,687,699 | B2 * | 6/2017 | Cole | A63B 53/0466 |
| 2010/0317460 | A1 | 12/2010 | Hirano | |

FOREIGN PATENT DOCUMENTS

| | | | |
|---|---|---|---|
| JP | 11299939 | | 11/1999 |
| JP | 11299939 A * | | 11/1999 |
| JP | 2000107332 | | 4/2000 |
| JP | 2000107332 A * | | 4/2000 |
| JP | 2004201852 | | 7/2004 |
| JP | 2004201852 A * | | 7/2004 |
| JP | 2006087928 | | 4/2006 |
| JP | 2006087928 A * | | 4/2006 |
| JP | 2008062008 | | 3/2008 |
| JP | 2008062008 A * | | 3/2008 ......... A63B 53/0466 |
| WO | 9920358 | | 4/1999 |
| WO | WO 9920358 A1 * | | 4/1999 ............. A63B 53/04 |

* cited by examiner

REINFORCED FACES OF CLUB HEADS AND RELATED METHODS

CROSS-REFERENCE TO RELATED APPLICATIONS

This application is a continuation application of U.S. Non-Provisional patent application Ser. No. 14/282,802, filed May 20, 2014, which is a continuation application of U.S. Non-Provisional patent application Ser. No. 13/407,559, filed Feb. 28, 2012, and International Patent Application No. PCT/US2012/038681, filed May 18, 2012. International Patent Application No. PCT/US2012/038681 is a continuation of U.S. Non-Provisional patent application Ser. No. 13/407,559. U.S. Non-Provisional patent application Ser. No. 13/407,559 and PCT/US2012/038681 are incorporated herein by reference in their entirety.

TECHNICAL FIELD

This disclosure relates generally to sports equipment, and relates more particularly to reinforced faces of club heads and related methods.

BACKGROUND

The center of gravity of a golf club can be strategically positioned according to the desired performance of the golf club. Because the position of the center of gravity of the golf club is dependent on the distribution of mass of the golf club and because it is often desirable, for performance purposes, to move the center of gravity down toward the sole and/or away from the face of the golf club head, the face of the golf club head may be made thin in order to move mass to the sole and/or away from the face. Thinning the face permits the center of gravity to be more strategically positioned, but may have side effects, such as, for example, reducing the strength and/or durability of the face and/or the golf club as a whole.

Meanwhile, the vibrational frequency of the face and/or golf club is another factor that may affect the performance of a golf club. The vibrational frequency of the face and/or golf club can be related to the elasticity of the face, golf club head, and/or golf club.

BRIEF DESCRIPTION OF THE DRAWINGS

To facilitate further description of the embodiments, the following drawings are provided in which.

Figure 1:
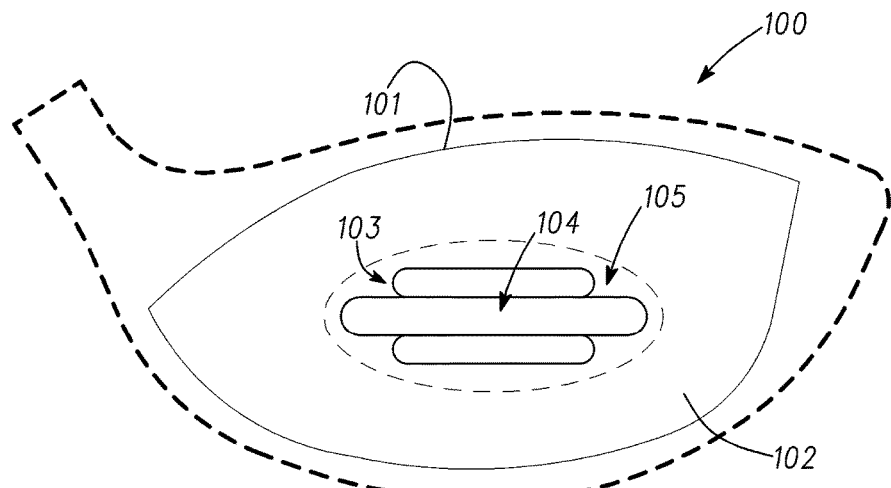
FIG. 1 illustrates a rear view of a front face for a club head when the front face is apart from the club head, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more mechanical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION

Some embodiments include a club head. The club head comprises a front face, and the front face comprises a front surface and a back surface opposite the front surface.

Likewise, the front face comprises one or more reinforcing structures. The reinforcing structure(s) are coupled with the front face at the back surface. Meanwhile, the reinforcing structure(s) comprise a solidified welding material. Also, the reinforcing structure(s) are devoid of adjoining structure other than the front face.

Various embodiments include a club head. The club head comprises a front face, one or more reinforcing structures, and a void adjacent to the back surface. Meanwhile, the front face comprises a front surface and a back surface opposite the front surface. The reinforcing structures (a) are coupled with a non-edge portion of the front face at the back surface, (b) comprise a solidified welding material, and (c) are bounded by only the back surface and the void when the reinforcing structure(s) are coupled with the front face at the back surface. Meanwhile, the front face comprises a front face material, and the solidified welding material comprises a filler material. Likewise, the reinforcing structure(s) form one or more layers at the back surface, and each of the layer(s) substantially forms one of a spiral pattern, a cross pattern, or a striped pattern. Further still, the club head comprises one of a driver-type club head, a fairway wood-type club head, a hybrid-type club head, an iron-type club head, a wedge-type club head, or a putter-type club head.

Further embodiments include a method. The method comprises: providing a front face of a club head, where the front face comprises a front surface and a back surface opposite the front surface; and providing one or more reinforcing structures at the back surface of the front face, wherein (a) the one or more reinforcing structures comprise a solidified welding material, and (b) the one or more reinforcing structures are devoid of adjoining structure other than the front face.

Meanwhile, some embodiments include a club head. The club head comprises a front face, and the front face comprises a front surface and a back surface opposite the front surface. Likewise, the front face comprises one or more reinforcing structures. The reinforcing structure(s) are coupled with the front face at the back surface. Meanwhile, the reinforcing structure(s) consist of a solidified welding material. Also, the reinforcing structure(s) are devoid of adjoining structure other than the back surface of the front face.

Various embodiments include a club head. The club head comprises a front face, one or more reinforcing structures, and a void adjacent to the back surface. Meanwhile, the front face comprises a front surface and a back surface opposite the front surface. The reinforcing structures (a) are coupled with a non-edge portion of the front face at the back surface, (b) consist of a solidified welding material, and (c) are bounded by only the back surface and the void when the reinforcing structure(s) are coupled with the front face at the back surface. Meanwhile, the front face comprises a front face material, and the solidified welding material comprises a filler material. Likewise, the reinforcing structure(s) form one or more layers at the back surface, and at least one of the layer(s) substantially forms one of a spiral pattern, a cross pattern, or a striped pattern. Further still, the club head comprises one of a driver-type club head, a fairway wood-type club head, a hybrid-type club head, an iron-type club head, a wedge-type club head, or a putter-type club head.

Further embodiments include a method. The method comprises: providing a front face of a club head, where the front face comprises a front surface and a back surface opposite the front surface; and providing one or more reinforcing structures at the back surface of the front face, wherein (a) the one or more reinforcing structures consist of a solidified welding material, and (b) the one or more reinforcing structures are devoid of adjoining structure other than the front face.

Turning to the drawings, FIG. 1 illustrates a rear view of front face 100 for a club head when front face 100 is apart from the club head, according to an embodiment. Front face 100 is merely exemplary and is not limited to the embodiments presented herein. Front face 100 can be employed in many different embodiments or examples not specifically depicted or described herein. Meanwhile, the club head can be similar or identical to club head 250 (FIG. 2), as described below.

Front face 100 comprises front surface 101, back surface 102, and can comprise one or more reinforcing structures 103. Back surface 102 is opposite front surface 101 and comprises back surface portion 105. Meanwhile, back surface portion 105 can correspond to a front surface portion (described below) of front surface 101. Accordingly, the front surface portion can be located opposite back surface portion 105. Further, back surface portion 105 can comprise central region 104 located approximately centrally within back surface portion 105. In FIG. 1, reinforcing structure(s) 103 comprises three reinforcing structures.

Reinforcing structure(s) 103 are coupled with front face 100 at back surface 102. For example, reinforcing structure(s) 103 can be coupled to some or all of back surface portion 105 (e.g., at approximately central region 104). As another example, reinforcing structure(s) 103 can be coupled to a non-edge portion of back surface 102. In further examples, reinforcing structure(s) 103 can be coupled to one or more other portions of back surface 102, instead of or in addition to back surface portion 105. Meanwhile, in many embodiments, reinforcing structure(s) 103 can be coupled to back surface 102 symmetrically about (a) a center of back surface 102, (b) a center of back surface portion 105 and/or (c) central region 104 and/or about one or more reference axes intersecting (x) the center of back surface 102, (y) the center of back surface portion 105 and/or (z) central region 104.

Front face 100 comprises a front face material, and reinforcing structure(s) 103 can comprise solidified welding material. The solidified welding material can comprise a filler material (and the front face material). In some embodiments, when reinforcing structure(s) 103 comprise multiple reinforcing structures, each of the multiple reinforcing structures can comprise the same solidified welding material (i.e., the multiple reinforcing structures comprise the same filler material), and/or one or more of the reinforcing structures can comprise different solidified welding material(s) from one or more other reinforcing structures of the multiple reinforcing structures (i.e., where some or all of the multiple reinforcement structures comprise different filler materials). Accordingly, although for convenience and clarity of illustration, the solidified welding material is described with respect to one solidified welding material, the same details can be applied to multiple solidified welding materials.

In many embodiments, the filler material can comprise and/or be the same material as the front face material. In other embodiments, the filler material and the front face material can be different materials (e.g., the filler material can be stronger or weaker than the front face material).

In many embodiments, the front face material and/or the filler material can each comprise one or more suitable metal(s), metal alloy(s), and/or thermoplastic(s) that can be used for welding. Exemplary metal(s) can comprise iron, aluminum, and titanium (e.g., commercially pure titanium ranging in purity from approximately 98.5% to approximately 99.5%, such as, for example, Grade 1 titanium (Commercially Pure-1), Grade 2 titanium (Commercially Pure-2), Grade 3 titanium (Commercially Pure-3)), etc. Commercially pure titanium can vary from one grade to another based on variations in the residual (e.g., interstitial) composition of oxygen, nitrogen, hydrogen, carbon, and/or iron present therein. Exemplary metal alloy(s) can comprise any suitable iron alloy(s) (e.g., steel), aluminum alloy(s), and/or titanium alloy(s), etc. Exemplary titanium alloy(s) can comprise Grade 5 titanium alloy (Ti-6Al-4V), Grade 9 titanium alloy (Ti-3Al-2.5V), Grade 23 titanium alloy (Ti-6Al-4V ELI (extra low interstitial)), Ti-8Al-1Mo-1V titanium alloy, Ti-5Al-2.5Sn titanium alloy, Ti-6Al-2Sn-4Zr-2Mo titanium alloy, Ti-5Al-5Sn-2Zr-2Mo titanium alloy, Ti-6Al-2Nb-1Ta-1Mo titanium alloy, Ti-3Al-13V-11Cr titanium alloy, Ti-11.5Mo-6Zr-4.5Sn titanium alloy, Ti-8Mo-8V-2Fe-3Al titanium alloy, Ti-15V-3Cr-3Al-3Sn titanium alloy, Ti-3Al-8V-6Cr-4Zr-4Mo titanium alloy, Ti-2Mo-1.6V-0.5Fe-4.5Al-0.3Si-0.03C titanium alloy, Ti-15V-3Cr-3Sn-3Al titanium alloy, Ti-10V-2Fe-3Al titanium alloy, Ti-4.5Al-3V-2Mo-2Fe titanium alloy, Dat51 titanium alloy, etc. In many examples, these exemplary titanium alloy(s) and/or other titanium alloy(s) can also comprise residual (e.g., interstitial) oxygen, nitrogen, hydrogen, carbon, and/or iron, etc.

Filler materials for welding are conventionally classified according to various specifications, such as, for example, the American Welding Society (AWS) specification (e.g., AWS A5.16) and/or the Aerospace Material Specification (AMS) (e.g., AMS 4951, AMS, 4954, AMS 4956, etc.). Meanwhile, filler materials can further be classified according to various grades within those specifications. Exemplary grades for titanium/titanium alloy-based filler materials under the AWS A5.16 specification can comprise ERTi-1, ERTi-2, ERTi-3, ERTi-4, ERTi-5, ERTi-5 ELI, ERTi-7, ERTi-9, ERTi-12, ERTi-23, etc. Generally speaking, these grades can correspond to the grade of the material of the base welding material (e.g., the front face material).

In many embodiments, the filler material can be chosen according to the front face material. Accordingly, in various embodiments, the filler material can comprise and/or be the same as the front face material or can comprise another material one grade below the front face material. For example, when the front face material comprises Grade 1 titanium (Commercially Pure-1) and/or Grade 1 titanium (Commercially Pure-1), the filler material can comprise AWS A5.16 ERTi-2 titanium alloy, etc. When the front face material comprises Grade 3 titanium (Commercially Pure-3), the filler material can comprise AWS A5.16 ERTi-3 titanium alloy, AWS A5.16 ERTi-9 titanium alloy, AWS A5.16 ERTi-9 ELI titanium alloy, etc. When the front face material comprises Grade 5 (Ti-6Al-4V) titanium alloy, the filler material can comprise AWS A5.16 ERTi-5 titanium alloy, AWS A5.16 ERTi-23 titanium alloy, etc. When the front face material comprises Grade 23 (Ti-6Al-4V ELI) titanium alloy, the filler material can comprise AWS A5.16 ERTi-23 titanium alloy, etc.

Figure 2:
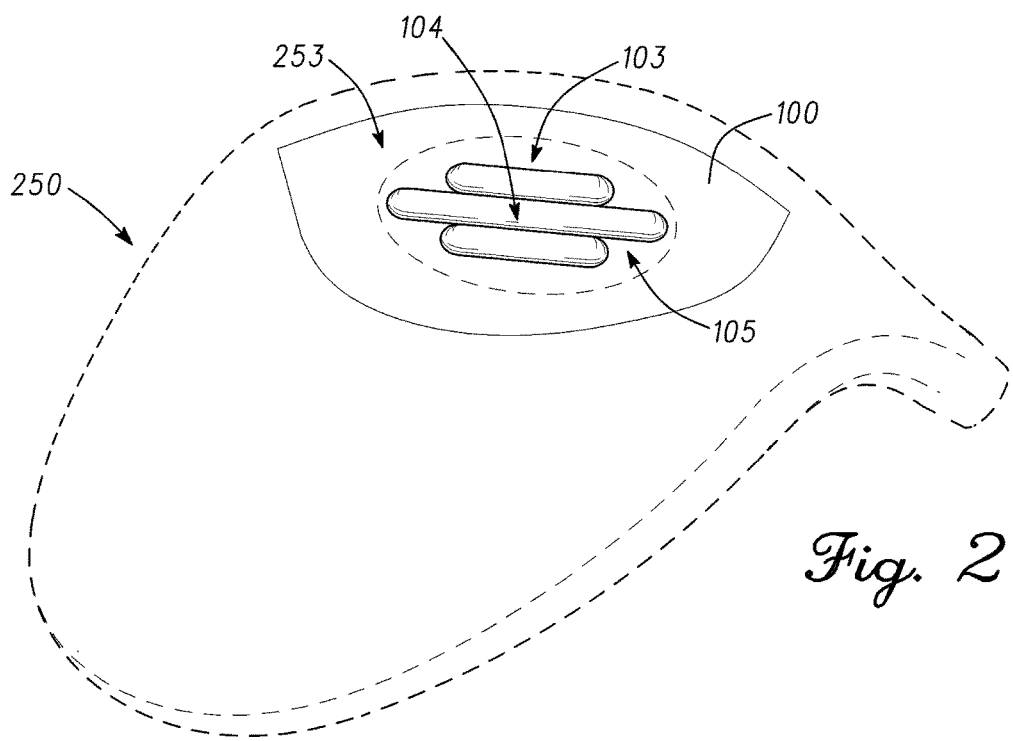
FIG. 2 illustrates an x-ray view of the front face when the front face is part of the club head, according to the embodiment of FIG. 1.

The choice of the front face material and/or the filler material can affect and/or change and/or alter the strength, vibrational frequency, and/or durability of front face 100 and/or club head 250 (FIG. 2). As a result, depending on the front face material and/or filler material used, the strength, vibrational frequency, and/or durability of front face 100 and/or club head 250 (FIG. 2) can be tuned as desired. Likewise, the front face material and/or filler material used can affect and/or change and/or alter the coefficient of restitution and/or the Young's modulus of elasticity of front face 100 and/or club head 250 (FIG. 2). For example, pairing a higher purity grade of titanium/titanium alloy (e.g., ERTi-2) filler material (as opposed to a lower purity grade of titanium/titanium alloy (e.g., ERTi-5)) with a titanium/titanium alloy face material can reduce the vibrational frequency of front face 100 and/or club head 250 (FIG. 2). In other examples, pairing a lower purity grade of titanium/titanium alloy (e.g., ERTi-5) filler material (as opposed to a higher purity grade of titanium/titanium alloy (e.g., ERTi-2)) with a titanium/titanium alloy face material can increase the strength of front face 100 and/or club head 250 (FIG. 2). Specifically, in these examples, ERTi-2 can comprise a yield strength of approximately 344.7 Mega-pascals (MPa) and ERTi-5 can comprise a yield strength of approximately 896.3 MPa. In still further examples, pairing one grade of titanium/titanium alloy (e.g., ERTi-5) filler material (as opposed to another grade of titanium/titanium alloy (e.g., ERTi-2)) with a titanium/titanium alloy face material (e.g., Grade 2 titanium) can alter the Young's modulus of elasticity of front face 100 and/or club head 250 (FIG. 2) differently. Specifically, in these examples, ERTi-2 can comprise a Young's modulus of elasticity of approximately 103 Giga-pascals (GPa), ERTi-5 can comprise a Young's modulus of elasticity of approximately 114 GPa, and Grade 2 titanium can comprise a Young's modulus of elasticity of approximately 103 GPa. Accordingly, in these examples, pairing ERTi-5 filler material with Grade 2 titanium face material can result in front face 100 and/or club head 250 (FIG. 2) comprising a higher Young's modulus of elasticity than when pairing ERTi-2 filler material with the Grade 2 titanium face material.

Meanwhile, metallurgical treatment(s) (e.g., annealing, cold-working, age hardening, etc.) performed on front face 100 and/or reinforcing structure(s) 103 while and/or after reinforcing structure(s) 103 are coupled with front face 100 at back surface 102 can also affect and/or change and/or alter the strength, vibrational frequency, durability, coefficient of restitution, and/or the Young's modulus of elasticity of front face 100 and/or club head 250 (FIG. 2). In many examples, front face 100 and/or reinforcing structure(s) 103 can be annealed after reinforcing structure(s) 103 are coupled with front face 100 at back surface 102.

In many embodiments, each reinforcing structure of reinforcing structure(s) 103 can comprise a length greater than or equal to approximately 1.000 centimeters and less than or equal to approximately 5.000 centimeters. Also, reinforcing structure of reinforcing structure(s) 103 can comprise a width greater than or equal to approximately 0.1905 centimeters and less than or equal to approximately 0.3175 centimeters. Where the width exceeds 0.3175 centimeters, excess heat produced when coupling reinforcing structure(s) 103 to front face 100 can warp front face 100 and/or change the grain structure of the front face material.

Further still, each reinforcing structure of reinforcing structure(s) 103 can comprise a thickness greater than or equal to approximately 0.0381 centimeters and less than or equal to approximately 0.1905 centimeters. The thickness of each reinforcing structure of reinforcing structure(s) 103 can refer to a distance that reinforcing structure of reinforcing structure(s) 103 projects away from back surface 102 when coupled to back surface 102. Further, when reinforcing structure(s) 103 are layered (e.g., stacked) at back surface 102 to form one or more layers, as described below, each reinforcing structure of reinforcing structure(s) 103, regardless of layer, can comprise a thickness greater than or equal to approximately 0.0381 centimeters and less than or equal to approximately 0.1905 centimeters. Meanwhile, reinforcing structure(s) 103 can comprise a total thickness or a summation of the thickness(es) of the reinforcing structure(s) at each of the layer(s) formed at back surface 102. For example, where reinforcing structure(s) 103 form two layers at back surface 102 and the reinforcing structure(s) at each layer comprise thicknesses of 0.0500 centimeters, the total thickness of reinforcing structure(s) 103 can be 0.100 centimeters. Accordingly, in some embodiments, when reinforcing structure(s) 103 are layered (e.g., stacked) at back surface 102 to form one or more layers, each of the reinforcing structure(s) within each layer of the layer(s) can comprise approximately the same thickness of the other reinforcing structure(s) therein. In other embodiments, the reinforcing structure(s) within each layer can comprise one or more different thicknesses.

Further, front face 100 can comprise an average front face thickness (i.e., an average distance between front surface 101 and back surface 102) of greater than or equal to approximately 0.1778 centimeters and less than or equal to approximately 0.3810 centimeters. Thus, in various examples, a ratio of the total thickness of reinforcing structure(s) 103 to the average front face thickness can be greater than or equal to approximately 0.1 and less than or equal to approximately 1.1.

Reinforcing structure(s) 103 are devoid of adjoining structure (e.g., structure coupled to reinforcing structure(s) 103) other than front face 100. Accordingly, the adjoining structure does comprise front face 100, which is coupled to reinforcing structure(s) 103. Said another way, reinforcing structure(s) 103 do not operate to couple another structure to front face 100. For example, reinforcing structure(s) 103 can be formed partially from a molten part of front face 100 combined with a molten filler material that has hardened into the solidified welding material without coupling any additional structure to back surface 102 of front face 100. Meanwhile, although reinforcing structure(s) 103 are described as being devoid of an adjoining structure other than front face 100, this statement does not imply that reinforcing structure(s) 103 are devoid of each other. For example, two or more reinforcing structures of reinforcing structure(s) 103 can be coupled to each other while also being coupled to front face 100. More specifically, the two or more reinforcing structures of reinforcing structure(s) 103 can be coupled (and in many examples, directly connected) to one another side by side (e.g., forming a plane parallel to back surface 102) and/or where arranged in multiple layers, as described below, one on top of another (e.g., stacked to form a plane orthogonal and/or skewed from back surface 102). Still, in the same or other embodiments, two or more reinforcing structures of reinforcing structure(s) 103 can be coupled with front face 100 apart from each other (e.g., without being directly connected together).

Beyond the materials and/or metallurgical treatments used for the front face material and/or the filler material, coupling reinforcing structure(s) 103 with front face 100 at back surface 102, in general, can also affect and/or change and/or alter the strength, vibrational frequency, durability, coefficient of restitution, and/or the Young's modulus of elasticity of front face 100 and/or club head 250 (FIG. 2). As a result, depending on the placement, arrangement, pattern, etc. of reinforcing structure(s) 103, the strength, vibrational frequency, durability, coefficient of restitution, and/or the Young's modulus of elasticity of front face 100 and/or club head 250 (FIG. 2) can be tuned as desired. Meanwhile, because coupling reinforcing structure(s) 103 can affect and/or change and/or alter the strength, vibrational frequency, durability, coefficient of restitution, and/or the Young's modulus of elasticity of front face 100 and/or club head 250 (FIG. 2) without using (e.g., coupling) and/or needing additional adjoining structure to do so, cost savings in manufacturing front face 100 and/or club head 250 (FIG. 2) can be realized.

Turning to the next drawing, FIG. 2 illustrates an x-ray view of front face 100 when front face 100 is part of club head 250, according to the embodiment of FIG. 1. Accordingly, in many embodiments, club head 250 can comprise front face 100 (FIG. 1), reinforcing structure(s) 103 (FIG. 1), and/or void 253, as illustrated by the cut-out at FIG. 2.

Void 253 can be adjacent to back surface 102 (FIG. 1) and/or reinforcement structure(s) 103 (FIG. 1). Meanwhile, reinforcing structure(s) 103 (FIG. 1) can be bounded and/or defined by back surface 102 and void 253 when reinforcing structure(s) 103 are coupled with front face 100 (FIG. 1) at back surface 102 (FIG. 1). Void 253 can refer to a volume that is devoid of reinforcing structure(s) 103. Void 253 can be an empty space (e.g., a hollow space, a cavity, an open space, etc.), but in many embodiments, can still be filled with material, such as, for example, damping material (e.g., foam).

The relationship of void 253 to reinforcing structure(s) 103 (FIG. 1) illustrates that reinforcing structure(s) 103 are devoid of adjoining structure. However, the relationship of void 253 to reinforcing structure(s) 103 also illustrates that while reinforcing structure(s) 103 (FIG. 1) are not coupled to adjoining structure other than front face 100 (FIG. 1), reinforcing structure(s) 103 (FIG. 1) can still be adjacent to other structure, such as, for example, any material at void 253, but does not couple the other structure to front face 100.

Club head 250 can comprise any suitable golf club head (e.g., a wood-type golf club head, such as, for example, a driver-type golf club head or a fairway wood-type golf club head), a hybrid-type golf club head, an iron-type golf club, a wedge-type golf club, and/or a putter-type golf club, etc.). For example, front face 100 (FIG. 1) can comprise a strike face of club head 250 Accordingly, front surface 101 (FIG. 1) can comprise a striking surface of the strike face for hitting a golf ball. Front face 100 (FIG. 1) can be (a) an integral component of club head 250 and/or (b) an interchangeable/removable component of club head 250.

Further, with front face 100 (FIG. 1) comprising the strike face of club head 250, the front surface portion (introduced above) of front surface 101 can refer to a portion of the striking surface of the strike face that provides a target strike zone with the golf ball (e.g., approximately maximizing force transfer while approximately minimally deviating from a desired flight path, such as, for example, a straight-line flight path) when hitting the golf ball. Accordingly, the front surface portion can be defined relative to any predetermined and/or established tolerances for maximum force transfer (e.g., greater than or equal to approximately 90 percent, 92 percent, 95 percent, 98 percent, etc.) and/or minimum flight path deviation (e.g., less than or equal to approximately 0.5 degrees, 1.0 degrees, 2.0 degrees, 5.0 degrees, etc.). Thus, the front surface portion can increase in size as the predetermined and/or established tolerances become less strict and can decrease in size as the predetermined and/or established tolerances become more strict. Meanwhile, as indicated above, back surface portion 105 (FIG. 1) can correspond to the front surface portion of front face 100 and can be coupled with reinforcing structure(s) 103 (FIG. 1) to reinforce the front face portion of front face 100 (FIG. 1).

Turning back to FIG. 1, in various embodiments, back surface portion 105 (FIG. 1) can comprise a back surface portion surface area of greater than or equal to approximately 3.225 square centimeters and less than or equal to approximately 9.678 square centimeters. Accordingly, the front surface portion of front surface 101 can also comprise a front surface portion surface area of greater than or equal to approximately 3.225 square centimeters and less than or equal to approximately 9.678 square centimeters. Further, reinforcing structure(s) 103 can comprise a reinforcing structure total surface area of greater than or equal to approximately 1.612 square centimeters and less than or equal to approximately 22.58 square centimeters.

Further, back surface 102 can comprise a back surface total surface area, which can comprise the back surface portion surface area. In various examples, a ratio of the reinforcing structure total surface area to the back surface total surface area can be greater than or equal to approximately 0.004 and less than or equal to approximately 0.560.

In many embodiments, the total thickness of reinforcing structure(s) 103 can be proportional (e.g., directly proportional) to the back surface total surface area. For example, where front face 100 is part of club face 250 (FIG. 2) and club face 250 comprises a driver-type golf club head, the back surface total surface area can be greater than where club face 250 comprises a fairway wood-type golf club head, such as, for example, because an average height of front face 100 (e.g., an average distance between a crown and a sole of club head 250 (FIG. 2)) can be greater where club face 250 comprises the driver-type golf club head than where club face 250 comprises the fairway wood-type golf club head.

As mentioned above, reinforcing structure(s) 103 can be layered (e.g., stacked) at back face surface 102 to form one or more layers. Stacking multiple layers of reinforcing structure(s) 103 can additionally affect and/or change and/or alter the strength, vibrational frequency, durability, coefficient of restitution, and/or the Young's modulus of elasticity of front face 100 and/or club head 250 (FIG. 2), where desired.

Likewise, each layer of reinforcing structure(s) 103 can substantially form a pattern. For example, the pattern can comprise a striped pattern (e.g., striped pattern 305 (FIG. 3)), a spiral pattern (e.g., spiral pattern 406 (FIG. 4)), a cross pattern (e.g., cross pattern 507 (FIG. 5)), and/or any other suitable pattern, such as, for example, as illustrated at FIGS. 1 and 2. The stripe pattern can be vertical and/or horizontal. The spiral pattern can be welded from central region 104 outward, or vice versa. Meanwhile, where reinforcing structure(s) 103 are layered in multiple layers, when each of the multiple layers comprises a striped pattern, each progressive layer can switch from horizontal stripes to vertical stripes, and vice versa. Likewise, where reinforcing structure(s) 103 are layered in multiple layers, the weld area of each progressive layer can be smaller than that of the prior or underlying layer, where the weld area is greatest closest to back surface 102.

Depending on the pattern formed, each layer of reinforcing structure(s) 103 can approximately form a shape (e.g., a cross, a circle, a quadrilateral, etc.). In many embodiments, the pattern and corresponding shape of reinforcing structure(s) can affect the concentration of stress at front face 100 such that it can be desirable to use a pattern (and shape) that minimizes the concentration of stress at front face 100. In some embodiments, reinforcing structure(s) 103 can be polished to reduce the concentration of stress at front face 100 as well.

Further, as mentioned previously, the pattern and corresponding shape of reinforcing structure(s) formed can affect and/or change and/or alter the strength, vibrational frequency, durability, coefficient of restitution, and/or the Young's modulus of elasticity of front face 100 and/or club head 250 (FIG. 2). Accordingly, the pattern and/or corresponding shape can be chosen to affect and/or change and/or alter the strength, vibrational frequency, durability, coefficient of restitution, and/or the Young's modulus of elasticity of front face 100 and/or club head 250 (FIG. 2) as desired.

Figure 3:
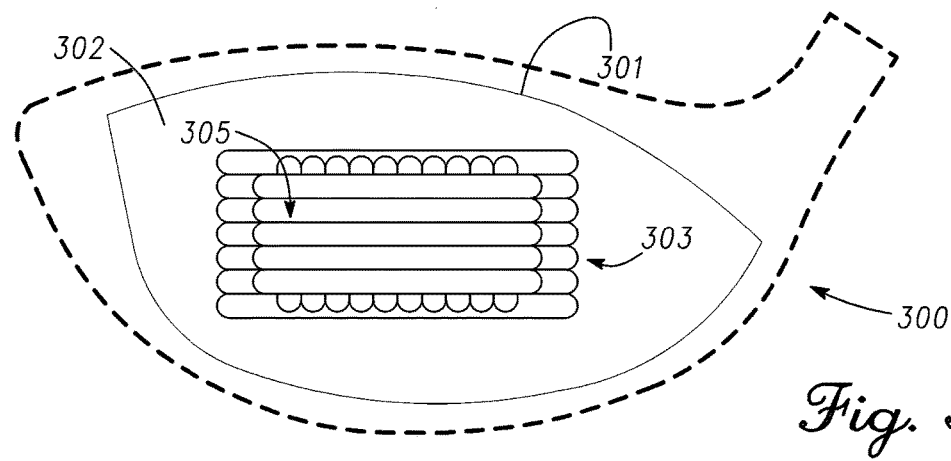
FIG. 3 illustrates a rear view of another front face for a club head when apart form the club head, according to another embodiment.

Skipping ahead in the drawings, FIG. 3 illustrates a rear view of front face 300 of a club head when front face 300 is apart from the club head. Front face 300 is similar to front face 100 (FIG. 1), and the club head is similar to club head 250 (FIG. 2). Accordingly, front face 300 comprises front surface 301 and back surface 302, which are similar or identical to front surface 101 (FIG. 1) and back surface 102 (FIG. 1), respectively. Meanwhile, reinforcing structure(s) 303 are coupled with front face 300 at back surface 302. Reinforcing structure(s) 303 are similar to reinforcing structure(s) 103 (FIG. 1) and form striped pattern 305.

Figure 4:
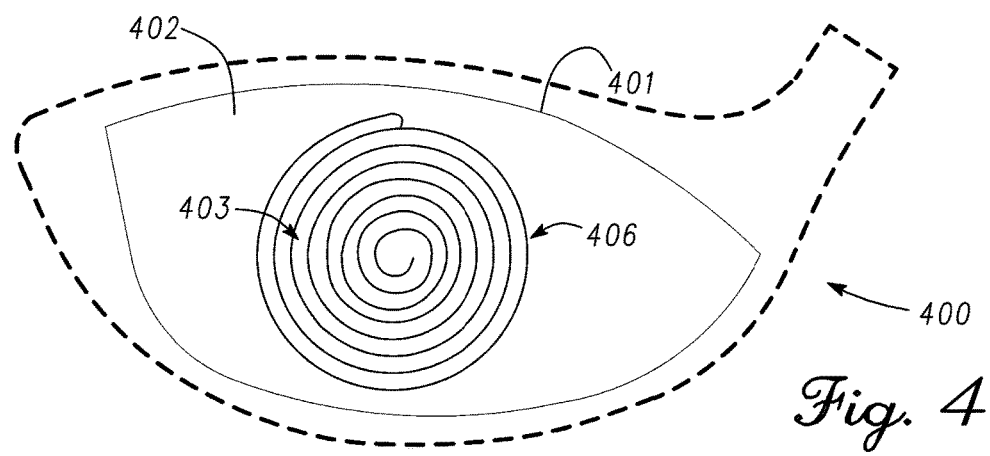
FIG. 4 illustrates a rear view of another front face for a club head when apart form the club head, according to another embodiment.

Meanwhile, FIG. 4 illustrates a rear view of front face 400 of a club head when front face 400 is apart from the club head. Front face 400 is also similar to front face 100 (FIG. 1), and the club head is also similar to club head 250 (FIG. 2). Accordingly, front face 400 comprises front surface 401 and back surface 402, which are similar or identical to front surface 101 (FIG. 1) and back surface 102 (FIG. 1), respectively. Meanwhile, reinforcing structure(s) 403 are coupled with front face 400 at back surface 402. Reinforcing structure(s) 403 are similar to reinforcing structure(s) 103 (FIG. 1) and form spiral pattern 406. In FIG. 4, reinforcing structure(s) 403 comprise a single reinforcing structure.

Figure 5:
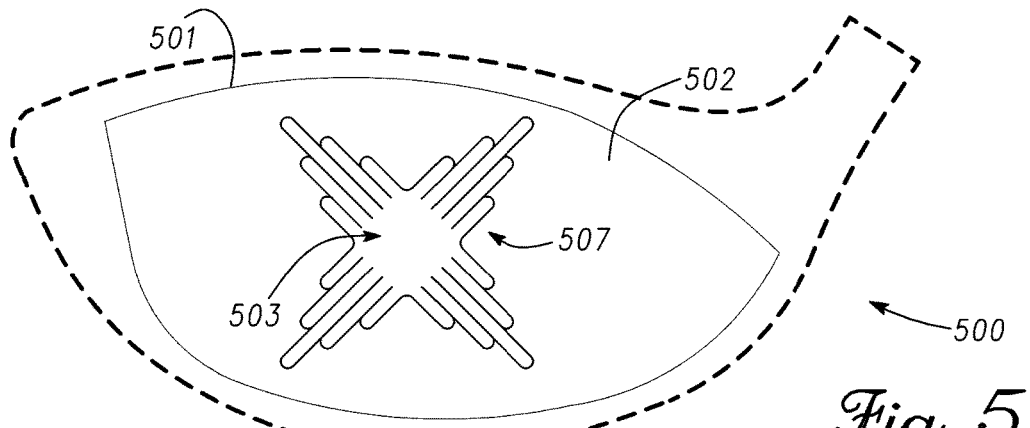
FIG. 5 illustrates a rear view of another front face for a club head when apart form the club head, according to another embodiment.

Furthermore, FIG. 5 illustrates a rear view of front face 500 of a club head when front face 500 is apart from the club head. Front face 500 is also similar to front face 100 (FIG. 1), and the club head is also similar to club head 250 (FIG. 2). Accordingly, front face 500 comprises front surface 501 and back surface 502, which are similar or identical to front surface 101 (FIG. 1) and back surface 102 (FIG. 1), respectively. Meanwhile, reinforcing structure(s) 503 are coupled with front face 500 at back surface 502. Reinforcing structure(s) 503 are similar to reinforcing structure(s) 103 (FIG. 1) and form cross pattern 507. In FIG. 5, reinforcing structure(s) 503 comprise eight reinforcing structures.

Figure 6:
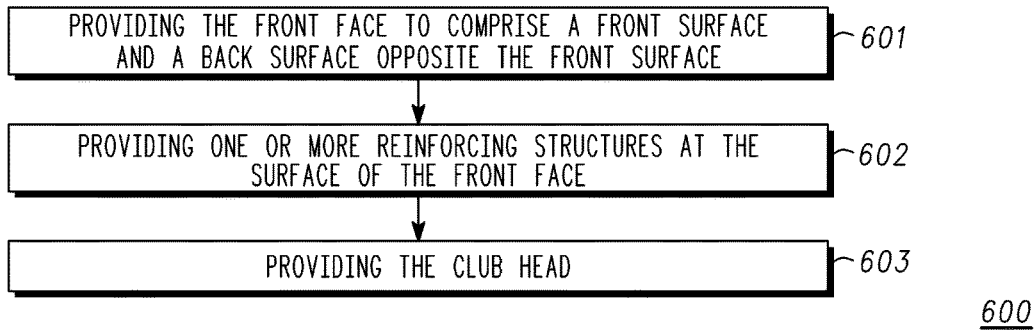
FIG. 6 illustrates a flow chart for an embodiment of a method of providing a front face and/or a club head.

Turning now to the next drawing, FIG. 6 illustrates a flow chart for an embodiment of method 600 of providing a club head. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any other suitable order. In still other embodiments, one or more of the procedures, the processes, and/or the activities in method 600 can be combined or skipped. The club head can be similar or identical to club head 250 (FIG. 2).

Figure 7:
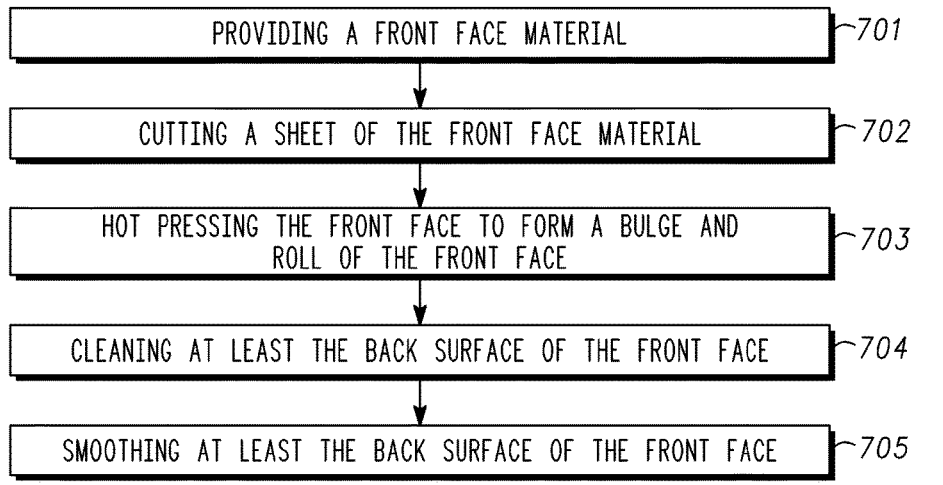
FIG. 7 illustrates an exemplary procedure of providing the front face to include a front surface and a back surface opposite the front surface, according to the embodiment of FIG. 6.

Method 600 can comprise procedure 601 of providing the front face to comprise a front surface and a back surface opposite the front surface. The front surface can be similar or identical to front surface 101 (FIG. 1), front surface 301 (FIG. 3), front surface 401 (FIG. 4), and/or front surface 501 (FIG. 5). Meanwhile the back surface can be similar or identical to back surface 102 (FIG. 1), back surface 302 (FIG. 3), back surface 402 (FIG. 4), and/or back surface 502 (FIG. 5). FIG. 7 illustrates an exemplary procedure 601.

Procedure 601 can comprise process 701 of providing a front face material. The front face material can be similar or identical to the front face material described above with respect to front face 100 (FIG. 1).

Procedure 601 can comprise process 702 of cutting a sheet of the front face material (e.g., with one of a laser or a water jet) to form the front face; and procedure 601 can comprise process 703 of hot pressing the front face to form a bulge and roll of the front face. In some embodiments, process 702 and/or process 703 can be omitted, such as, for example, where the front face material is already cut and/or shaped.

Procedure 601 can comprise process 704 of cleaning at least the back surface of the front face. Process 704 can be performed before performing part or all of procedure 602 (FIG. 6). Performing process 704 can comprise acid cleaning at least the back surface of the front face and/or wiping at least the back surface of the front face with one or more solvents (e.g., one or more non-chlorinated solvent, such as, for example, acetone, toluene, methyl ethyl ketone (MEK), etc.) using one or more lint-free cloths and/or cellulose sponges in a manner that leaves substantially no residue behind from the lint-free cloth(s) and/or cellulose sponge(s). Performing process 704 can remove substantially any contaminants (e.g., mill scale, dirt, dust, grease, oil, moisture, etc.) from the back surface and/or the front face that can degrade the mechanical properties and/or corrosion resistance of the front face and/or that can degrade the subsequently formed bond between the front face and the one or more reinforcing structures. Solvents can be particularly effective for removing grease and/or oil. Where performing process 704 comprises wiping at least the back surface of the front face with one or more solvents, performing process 704 can further comprise wire brushing (e.g., with a stainless steel brush, steel brush, steel wool, etc.) at least the back surface of the front face after wiping at least the back surface of the front face with the one or more solvents. Where the front face material comprises titanium, stainless steel brushes can be used to avoid reduction of corrosion resistance in the front face and/or embedding iron particles in the front face.

Procedure 601 can comprise process 705 of smoothing at least the back surface of the front face. Performing process 705 can comprise filing the back surface of the front face, such as, for example, to remove burn marks, burrs, and/or sharp edges from the back surface of the front face. Although sand paper and steel wool can be also be used to perform process 705, sand paper and steel wool can leave behind undesirable contaminants, which can be avoided by using a sharp file instead. Process 705 can be performed before performing part or all of procedure 602 (FIG. 6). In some embodiments, process 704 and/or process 705 can be omitted.

Figure 8:
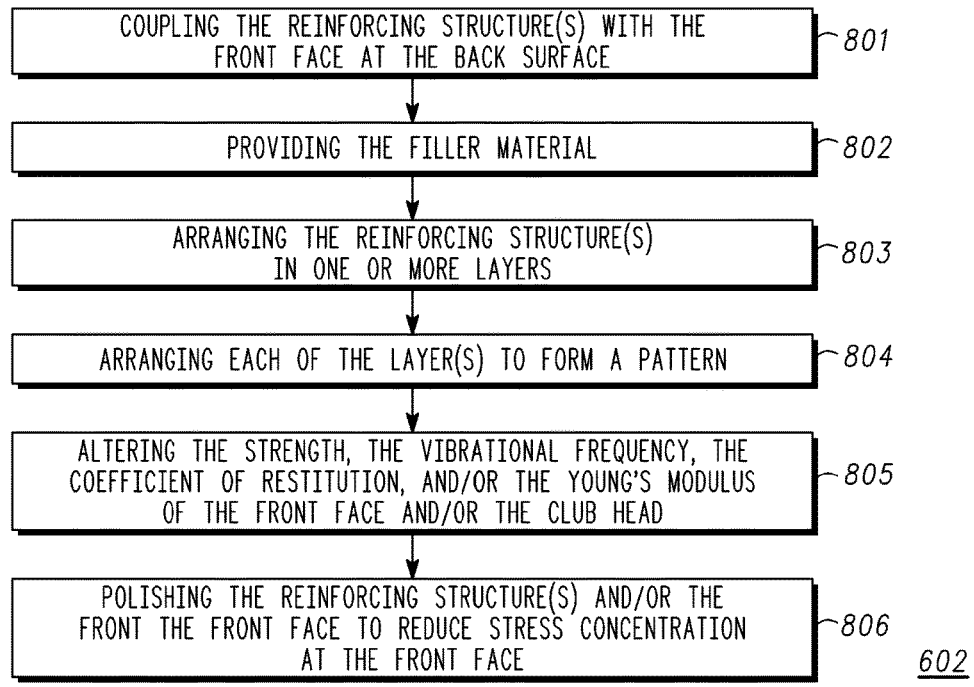
FIG. 8 illustrates an exemplary procedure of providing one or more reinforcing structures at the back surface of the front face, according to the embodiment of FIG. 6.

Returning to FIG. 6, method 600 can comprise procedure 602 of providing one or more reinforcing structures at the back surface of the front face. The reinforcing structure(s) can be similar or identical to reinforcing structure(s) 103 (FIG. 1), reinforcing structure(s) 303 (FIG. 3), reinforcing structure(s) 403 (FIG. 4), and/or reinforcing structure(s) 503 (FIG. 5). FIG. 8 illustrates an exemplary procedure 602.

Figure 9:
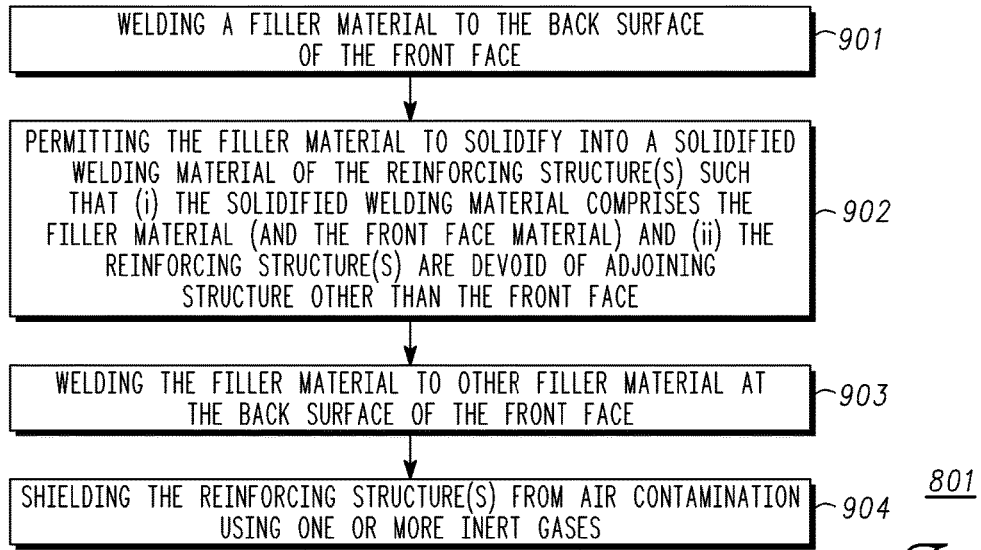
FIG. 9 illustrates an exemplary process of coupling the reinforcing structure(s) with the front face at the back surface, according to the embodiment of FIG. 8.

Procedure 602 can comprise process 801 of coupling the reinforcing structure(s) with the front face at the back surface. In many embodiments, process 801 can be performed at ambient temperature. FIG. 9 illustrates an exemplary process 801.

Process 801 can comprise activity 901 of welding a filler material to the back surface of the front face. The filler material can be similar or identical to the filler material described above with respect to front face 100 (FIG. 1).

Performing activity 901 can comprise arc welding (e.g., metal inert gas (MIG) welding, tungsten inert gas (TIG) welding, etc.) the filler material to the back surface of the front face. Activity 901 can be performed with a conventional thoriated tungsten electrode (e.g., an AWS EWTh-1 electrode, an AWS EWTh-2 electrode, etc.). Electrode size can be governed by the smallest diameter of the electrode that is able to carry welding electric current. Grinding the electrode to a point can improve arc initiation and/or control the spread of the arc. The electrode can extend 1.5 times the size of the diameter beyond the end of the nozzle of the welder.

When the front face material comprises an unalloyed titanium, activity 901 can be performed while the front face material and/or the filler material are in an annealed condition.

Process 801 can continue with activity 902 of permitting the filler material to solidify into a solidified welding material of the reinforcement structure(s) such that (i) the solidified welding material comprises the filler material (and the front face material) and (ii) the reinforcement structure(s) are devoid of adjoining structure other than the front face. The solidified welding material can be similar or identical to the solidified welding material described above with respect to front face 100 (FIG. 1). When the solidified welding material comprises a low-grade titanium alloy, hydride precipitation can embrittle the solidified welding material. Performing process 704, process 705, and/or activity 904 can help reduce and/or prevent hydride precipitation.

In some embodiments, process 801 can comprise activity 903 of welding the filler material to other filler material at the back surface of the front face. Performing activity 903 can be similar to performing activity 901. In these embodiments, activity 902 and activity 903 can be repeated. In various embodiments, activity 901, activity 902, and/or activity 903 can be performed as part of process 803 (FIG. 8) and/or process 804 (FIG. 8). In other embodiments, activity 903 can be omitted.

Process 801 can also comprise activity 904 of shielding the reinforcing structure(s) from air contamination using one or more inert gases, such as, for example, until the temperature of the reinforcing structure(s) falls below a temperature (e.g., approximately 427° C.). Exemplary inert gas(es) comprise argon, helium, etc. Using argon to shield the reinforcing structure(s) can permit superior arc stability for welding, and using argon-helium gas mixtures can permit welding at higher voltages, hotter arcs, and/or at greater depths of penetration. Generally speaking, using argon can also be cheaper than using helium. Activity 804 can be performed while performing activity 901, activity 902, and/or activity 903.

Turning back to FIG. 8, procedure 602 can comprise process 802 of providing the filler material. In some embodiments, process 802 can be performed as part of process 801.

Procedure 602 can further comprise process 803 of arranging the reinforcement structure(s) in one or more layers. The layer(s) can be similar or identical to the layer(s) described above with respect to front face 100 (FIG. 1).

Procedure 602 can also comprise process 804 of arranging each of the layer(s) to form a pattern. The pattern(s) can be similar or identical to the pattern(s) described above with respect to front face 100 (FIG. 1).

Procedure 602 can additionally comprise process 805 of altering the strength, the vibrational frequency, the durability, the coefficient of restitution, and/or the Young's modulus of the front face and/or the club head. Processes 803, 804, and/or 805 can occur simultaneously with each other.

Procedure 602 can comprise process 806 of polishing the reinforcement structure(s) and/or the front face to reduce stress concentrations at the front face. Performing process 806 can comprise shot peening, milling (e.g., computer numerical controlled (CNC) milling), and/or hand polishing the reinforcement structure(s) and/or the front face.

Returning again to FIG. 6, method 600 can comprise procedure 603 of providing the club head. In some embodiments, procedure 601 and/or procedure 602 can be performed as part of procedure 603. Performing procedure 603 can comprise welding the front face to another portion of the club head via robotic plasma welding.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 601-603 of FIG. 6, processes 701-705 of FIG. 7, processes 801-806 of FIG. 8, and/or activities 901-904 of FIG. 9 may be comprised of many different procedures, processes, and/or activities and be performed by many different modules, in many different orders, that any element of FIGS. 1-9 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with a wood-type golf club head (e.g., a driver-type golf club head or a fairway wood-type golf club head) or a hybrid-type golf club head, the apparatus, methods, and articles of manufacture described herein may be applicable to other types of golf clubs such as an iron-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A club head comprising:
   a front face,
   the front face comprising a front surface and a back surface opposite the front surface; and
   one or more reinforcing structures;
   wherein:
   the one or more reinforcing structures are coupled with the front face at the back surface;
   the one or more reinforcing structures consist of a solidified welding material; and
   the one or more reinforcing structures are devoid of an adjoining structure other than the back surface of the front face;
   the front face comprises a front face material;
   the solidified welding material comprises a filler material; and
   the one or more reinforcing structures are coupled symmetrically about a center of the back surface.

2. The club head of claim 1 wherein:
   the front face comprises a first titanium material; the one or more reinforcing structures comprise a second titanium material; and
   the first titanium material is at least one titanium material grade above the second titanium material.

3. The club head of claim 1 wherein
   at least one of the front face material or the filler material comprises titanium.

4. The club head of claim 1 wherein:
   the one or more reinforcing structures form one or more layers at the back surface; and
   each of the one or more layers substantially forms one of a spiral pattern or a multi-striped pattern.

5. The club head of claim 1 wherein:
   the one or more reinforcing structures alter at least one of: a strength of the front face; a vibrational frequency of the front face; or a Young's modulus of elasticity of the front face.

6. The club head of claim 1 wherein:
   the front surface comprises a front surface portion; the back surface comprises a back surface portion approximately corresponding and opposite to a target strike zone of the front surface portion; and
   the one or more reinforcing structures are coupled to at least part of the back surface portion of the back surface of the front face.

7. The club head of claim 1 wherein:
   the front face comprises a perimeter edge; and
   the one or more reinforcing structures at the back surface are located away from the perimeter edge.

8. The club head of claim 1 wherein:
   the one or more reinforcing structures comprise a plurality of reinforcing layers at the back surface; the plurality of reinforcing layers comprise:
   a first reinforcing layer aligned in a first direction; and a second reinforcing layer aligned in a second direction different than the first direction; and
   the first and second reinforcing layers intersect each other.

9. A club head comprising:
a front face, the front face comprising a front surface and a back surface opposite the front surface; one or more reinforcing structures; and a void adjacent to the back surface;
wherein:
the one or more reinforcing structures are coupled with a non-edge portion of the front face at the back surface;
the one or more reinforcing structures consist of a solidified welding material;
the one or more reinforcing structures are devoid of adjoining structure other than the back surface of the front face, and
the front face comprises a front face material;
the solidified welding material comprises a filler material;
the one or more reinforcing structures form one or more layers at the back surface;
at least one of the one or more layers substantially forms one of a spiral pattern, a cross pattern, or a striped pattern;
and the club head comprises one of a driver-type club head, a fairway wood-type club head, a hybrid-type club head, an iron-type club head, a wedge-type club head, or a putter-type club head,
and
wherein the one or more reinforcing structures are coupled symmetrically about a center of the back surface.

10. The club head of claim 9 wherein:
the one or more reinforcing structures alter at least one of: a strength of the front face; a vibrational frequency of the front face; or a Young's modulus of elasticity of the front face.

11. The club head of claim 9 wherein:
the one or more layers comprise: a first reinforcing layer; and a second reinforcing layer intersected with the first reinforcing layer.

12. A method comprising:
providing a front face of a club head, the front face comprising a front surface and a back surface opposite the front surface; and
providing one or more reinforcing structures at the back surface of the front face;
wherein:
the one or more reinforcing structures consist of a solidified welding material; and
the one or more reinforcing structures are devoid of adjoining structure other than the front face, and
providing the one or more reinforcing structures at the back surface of the front face comprises: coupling the one or more reinforcing structures with the front face at a non-edge portion of the back surface;
coupling the one or more reinforcing structures with the front face at the back surface comprises:
welding a filler material to the back surface of the front face,
the solidified welding material comprising the filler material; and
wherein the one or more structures are coupled symmetrically about a center of the back surface.

13. The method of claim 12 wherein:
providing the one or more reinforcing structures at the back surface of the front face comprises:
coupling the one or more reinforcing structures with the front face at a non-edge portion separate from a perimeter edge of the back surface.

14. The method of claim 12 wherein:
coupling the one or more reinforcing structures with the front face at the back surface comprises:
welding the filler material to the back surface of the front face comprises:
arc welding the filler material to the back surface of the front face.

15. The method of claim 12 wherein:
providing the one or more reinforcing structures at the back surface of the front face comprises:
coupling the one or more reinforcing structures with the front face at the back surface;
wherein coupling the one or more reinforcing structures with the front face at the back surface comprises:
welding a filler material to the back surface of the front face,
the solidified welding material comprising the filler material;
wherein welding the filler material to the back surface of the front face comprises:
arc welding the filler material to the back surface of the front face; and
arc welding the filler material to the back surface of the front face comprises one of:
metal inert gas welding the filler material to the back surface of the front face; or
tungsten inert gas welding the filler material to the back surface of the front face.

16. The method of claim 12 wherein:
providing the one or more reinforcing structures at the back surface of the front face comprises:
coupling the one or more reinforcing structures with the front face at the back surface, wherein the front face comprises a front face material;
wherein coupling the one or more reinforcing structures with the front face at the back surface comprises:
welding a filler material to the back surface of the front face while the front face material and the filler material are in an annealed condition,
wherein the solidified welding material comprises the filler material.

17. The method of claim 12 wherein:
providing the front face comprises providing a front face material; and
providing the one or more reinforcing structures comprises providing the filler material.

18. The method of claim 12 wherein:
providing the one or more reinforcing structures comprises:
arranging the one or more reinforcing structures in one or more layers, and arranging each of the one or more layers to form one of a spiral pattern or a multi-striped pattern.

* * * * *